(12) United States Patent
Quiroz de la mora et al.

(10) Patent No.: US 10,139,621 B2
(45) Date of Patent: Nov. 27, 2018

(54) MOTION TRANSFER MECHANISM FOR A COMBINER HEADS UP DISPLAY INCLUDING DOUBLE LOCKING PIN

(71) Applicant: Continental Automotive Systems, Inc., Auburn Hills, MI (US)

(72) Inventors: Luis Ernesto Quiroz de la mora, Tlaquepaque (MX); Johan Gomez Martinez, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/379,903

(22) Filed: Dec. 15, 2016

(65) Prior Publication Data

US 2018/0172992 A1    Jun. 21, 2018

(51) Int. Cl.
| | |
|---|---|
| *G02B 27/14* | (2006.01) |
| *G02B 27/01* | (2006.01) |
| *F16H 21/44* | (2006.01) |
| *F16M 13/02* | (2006.01) |
| *B60K 35/00* | (2006.01) |

(52) U.S. Cl.
CPC .......... *G02B 27/0149* (2013.01); *B60K 35/00* (2013.01); *F16H 21/44* (2013.01); *F16M 13/022* (2013.01); *G02B 27/0101* (2013.01); *B60K 2350/405* (2013.01); *F16M 2200/06* (2013.01); *G02B 2027/015* (2013.01); *G02B 2027/0141* (2013.01); *G02B 2027/0154* (2013.01)

(58) Field of Classification Search
CPC ...... G02B 2027/013; G02B 2027/0154; G02B 2027/0159; G02B 2027/0161; G02B 2027/0163; G02B 2027/0169; G02B 2027/0181; G02B 2027/0183; G02B 2027/0198; G02B 27/01; G02B 27/0149; G02B 2027/014
USPC .......................... 359/630, 631, 632; 345/7, 9
See application file for complete search history.

(56) References Cited

U.S. PATENT DOCUMENTS

2013/0043708 A1* 2/2013 Gupte ..................... B60N 2/12
                                                             297/378.12

* cited by examiner

*Primary Examiner* — William Choi

(57) ABSTRACT

A combiner heads-up (HUD) display assembly having a motion transfer mechanism, where the combiner HUD assembly includes a housing, a plurality of linkage members disposed in the housing, an actuator disposed in the housing and connected to one of the plurality of linkage members, and a bracket connected to one of the plurality of linkage members. A display device, such as a combiner mirror, is connected to the bracket. The actuator changes the plurality of linkage members between a first configuration, where the display device is in a stowed position, and a second configuration, where the display device is in a deployed position. A pin is integrally formed with the bracket, and the pin is in contact with at least one of the plurality of linkage members when the display device is in the stowed position and the deployed position.

12 Claims, 5 Drawing Sheets

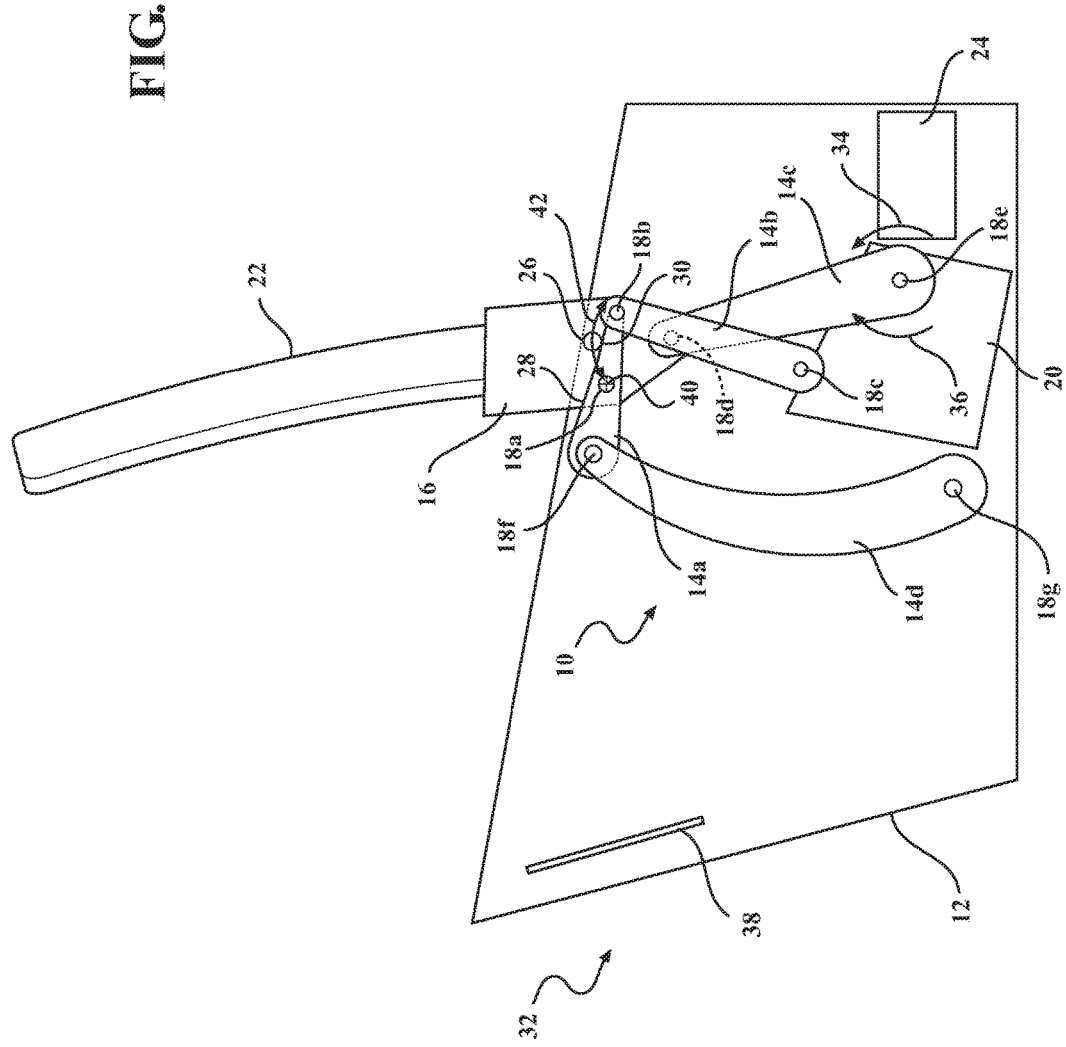

MOTION TRANSFER MECHANISM FOR A COMBINER HEADS UP DISPLAY INCLUDING DOUBLE LOCKING PIN

FIELD OF THE INVENTION

The invention relates generally to a combiner heads-up display for the interior of a motor vehicle having a motion transfer mechanism which includes multiple linkage pieces, where at least one of the linkages is used to define a maximum range of motion for the combiner heads-up display when changing between a stowed position and a deployed position.

BACKGROUND OF THE INVENTION

Combiners are generally known, and are a type of heads-up display (HUD) to display information for the driver of the vehicle. A combiner HUD typically has some type of display, such as a combiner mirror, that may either be deployed or stowed, depending upon the desire of the driver, and the mode of operation of the vehicle. The combiner mirror is typically made of glass or plastic, and different types of gauges or indicators are projected onto the combiner mirror, such as the speedometer, tachometer, fuel gauge, temperature gauge, or the like.

The combiner mirror is typically moved between the stowed position and the deployed position by some type of actuator, such as an electric motor, and a gear train, or other type of mechanism to transfer power from the motor and change the configuration of the combiner mirror. There are typically at least two mechanical stops used to provide a maximum range of motion for the combiner mirror, and therefore determine the deployed position and the stowed position of the combiner mirror.

However, these mechanical stops take up space in the housing of the combiner HUD. Accordingly, there exists a need for a mechanism used with a motor and a combiner mirror to control the range of motion of the combiner mirror, while minimizing the number of parts used.

SUMMARY OF THE INVENTION

The present invention is a combiner head-up display (HUD) assembly having a motion transfer mechanism, where the combiner HUD assembly includes a housing, and a motion transfer mechanism having a plurality of linkage members, where the plurality of linkage members are disposed in the housing. An actuator is disposed in the housing and connected to one of the plurality of linkage members, and a bracket connected to one of the plurality of linkage members. A display device, such as a combiner mirror, is connected to the bracket. The actuator changes the plurality of linkage members between a first configuration, where the display device is in a stowed position, and a second configuration, where the display device is in a deployed position. A pin is integrally formed with the bracket, and the pin is in contact with at least one of the plurality of linkage members when the display device is in the stowed position and the deployed position.

The plurality of linkage members includes a first linkage member connected to the bracket, and the pin is in contact with the first linkage member when the display device is in both the stowed position and the deployed position.

The first linkage member includes a first contact point and a second contact point. The pin is in contact with the first contact point when the display device is in the stowed position, and the pin is in contact with the second contact point when the display device is in the deployed position.

The first linkage member is connected to the bracket at a pivot point, and the first contact point is located on the first linkage member on the opposite side of the at least one pivot point in relation to the second contact point.

The plurality of linkages includes a second linkage member connected to the first linkage member and the housing, a third linkage member connected to the bracket, and a fourth linkage member connected to the first linkage member and the housing. The third linkage member is rotated by the actuator in a first direction to change the display device from the stowed position to the deployed position, and the third linkage member is rotated by the actuator in a second direction to change the display device from the deployed position to the stowed position.

The plurality of linkage members are in the first configuration when the display device is in the stowed position, and in the second configuration when the display device is in the deployed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a diagram of a side view of a combiner heads-up display assembly having a motion transfer mechanism, with the combiner heads-up display assembly in a deployed position, according to embodiments of the present invention.

DETAILED DESCRIPTION OF THE PREFERRED EMBODIMENTS

Figure 1:
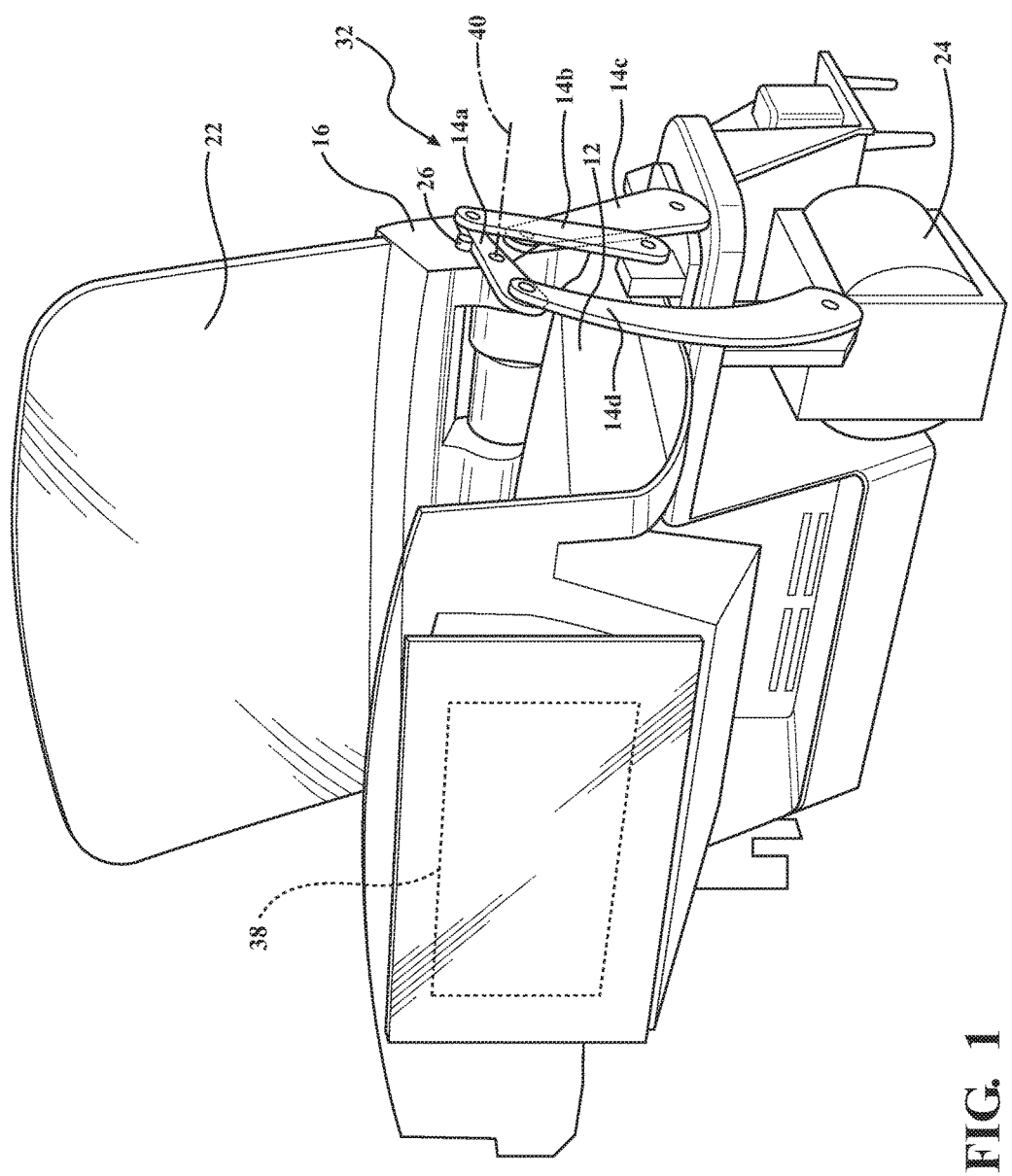
FIG. 1 is a first perspective view of a combiner heads-up display assembly having a motion transfer mechanism, with the combiner heads-up display assembly in a deployed position, according to embodiments of the present invention.

The following description of the preferred embodiment(s) is merely exemplary in nature and is in no way intended to limit the invention, its application, or uses.

A motion transfer mechanism according to the present invention used for a combiner heads-up display (HUD) assembly is shown in the Figures, generally at 10. The mechanism 10 is located in a housing 12, where the housing 12 is located in the dashboard of a vehicle. The mechanism 10 includes a first linkage member, or following arm, 14a pivotally connected to a bracket 16 at a first pivot point 18a. The first linkage member 14a is pivotally connected to a second linkage member 14b at a second pivot point 18b, and the second linkage member 14b is pivotally connected to the housing 12 at a third pivot point 18c. There is also a third linkage member 14c connected to the bracket 16 at a fourth pivot point 18d, and the third linkage member 14c is also connected to the housing 12 at a fifth pivot point 18e. A fourth linkage member 14d is connected to the first linkage member 14a at a sixth pivot point 18f, and is also connected to the housing 12 at a seventh pivot point 18g. Each of the linkage members 14a,14b,14c,14d are part of the motion transfer mechanism 10.

Figure 2:
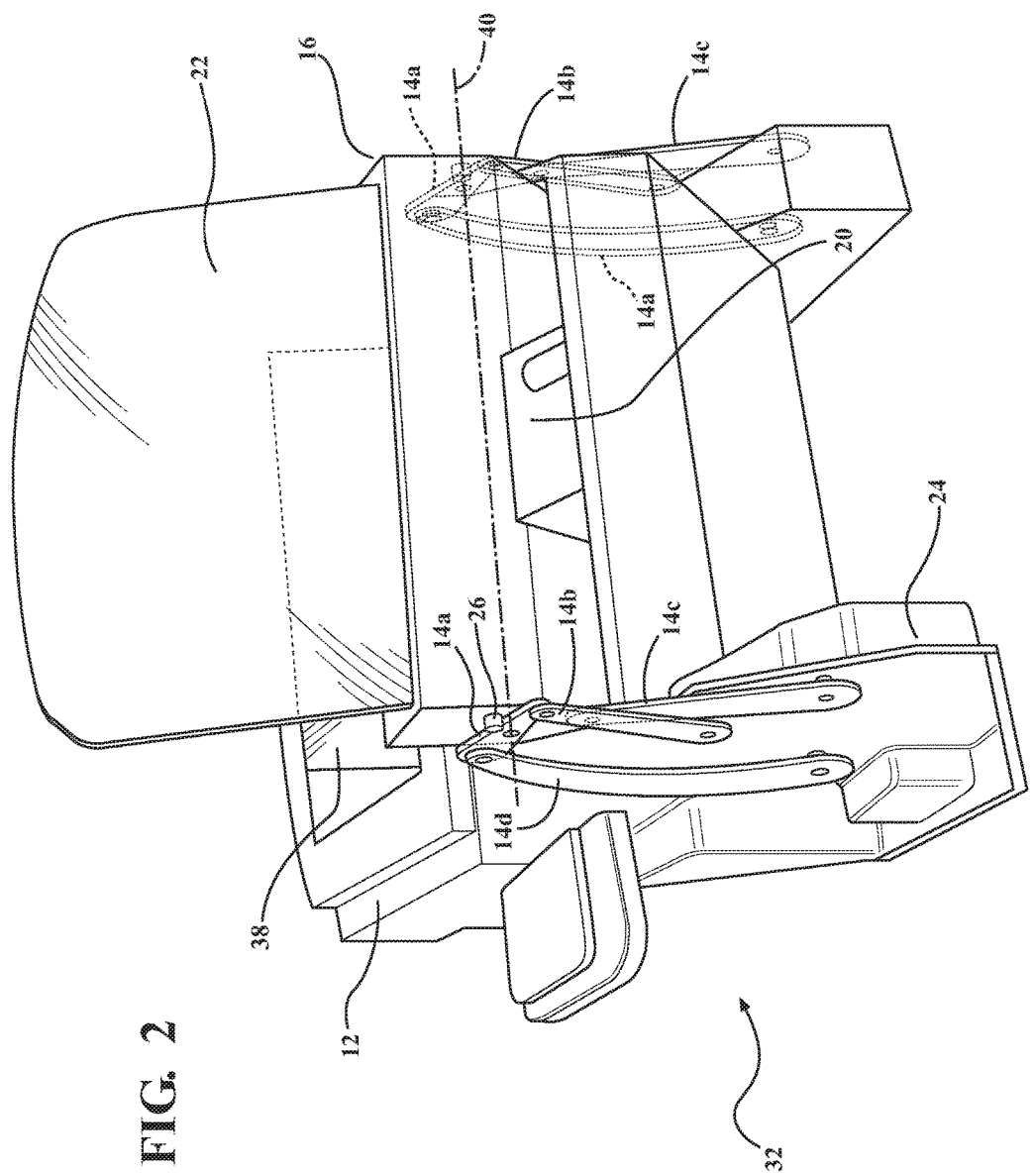
FIG. 2 a second perspective view of a combiner heads-up display assembly having a motion transfer mechanism, with the combiner heads-up display assembly in a deployed position, according to embodiments of the present invention.

A picture generation unit (PGU) 20 is also located in the housing 12 in proximity to the second and third linkage members 14b,14c. Connected to the bracket 16 is a display device 22, which in this embodiment is a combiner mirror. The mirror 22 is able to be moved between a stowed position, where the mirror 22 is located in the housing 12, as shown in FIG. 3, and a deployed position, where the mirror 22 is positioned as shown in FIGS. 1-2, and 5.

Also disposed in the housing 12 is a motor 24 which is connected to the third linkage member 14c, such that in this embodiment the third linkage member 14c functions as a drive member. The motor 24 is actuated by some type of controller (not shown) to rotate the third linkage member 14c about the fifth pivot point 18e in either a first direction 34 or a second direction 36. The third linkage member 14c is rotated in the first direction 34 to change the linkage members 14a,14b,14c,14d from a first configuration, as shown in FIG. 3, to a second configuration, as shown in FIGS. 1-2, and 5. The bracket 16 includes a mechanical stop, which in this embodiment is a pin 26, and the pin 26 is in contact with the first linkage member 14a at a first contact point 28 when the linkage members 14a,14b,14c,14d are in the first configuration. The pin 26 is also in contact with the first linkage member 14a at a second contact point 30 when the linkage members 14a,14b,14c,14d are in the second configuration. The first contact point 28 is on one side of the first pivot point 18a, and the second contact point 30 is on the opposite side of the first pivot point 18a in relation to the first contact point 28.

The mechanism 10, display device 22, and housing 12 are all part of a combiner HUD assembly, shown generally at 32. The combiner HUD assembly 32 is used for displaying different gauges or indicators that are part of the instrument cluster assembly of the vehicle. When in the deployed position shown in FIGS. 1-2, and 5, different gauges or indicators, such as the speedometer, fuel gauge, tachometer, and the like may be displayed on the display device 22. When in the deployed position, the display device 22 may be placed in front of the windshield of the vehicle in the driver's line of sight, so as to be readily visible, such that the driver is still able to view the road and oncoming traffic. The PGU 20 projects the desired graphics onto a flat mirror 38, which is also located in the housing 12. The projected graphics reflect off of the flat mirror 38 and onto the combiner mirror 22.

Figure 3:
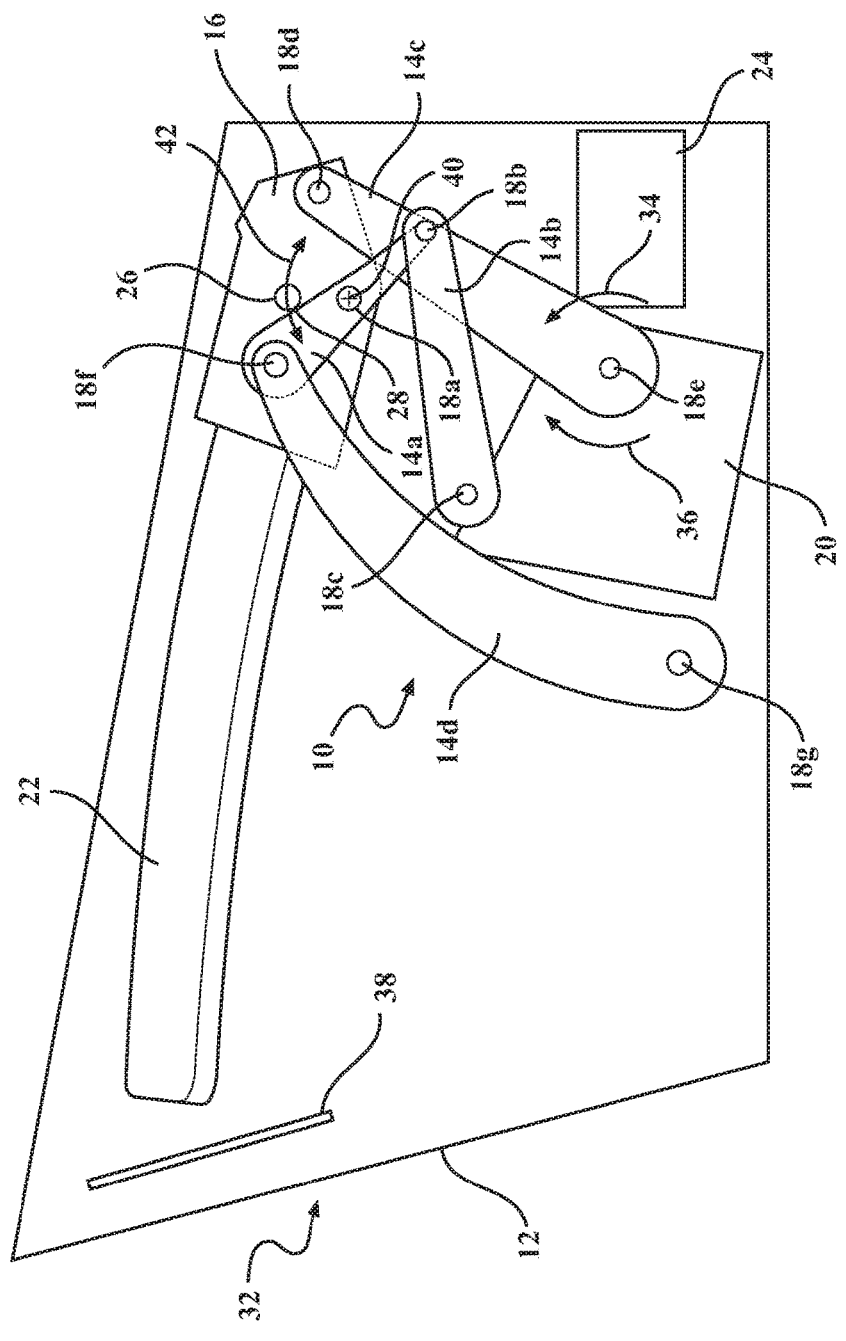
FIG. 3 is a diagram of a side view of a combiner heads-up display assembly having a motion transfer mechanism, with the combiner heads-up display assembly in a stowed position, according to embodiments of the present invention.
Figure 4:
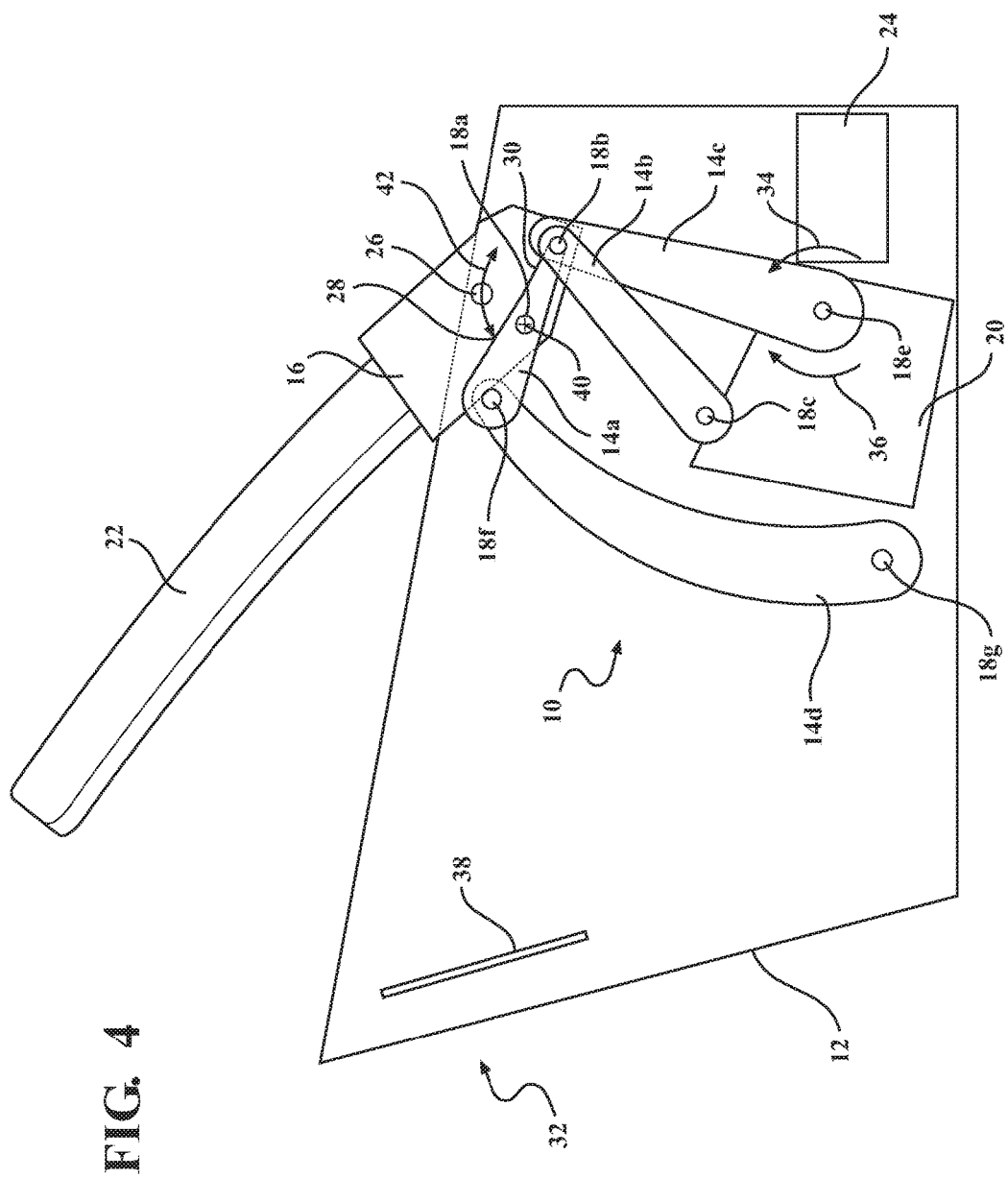
FIG. 4 is a diagram of a side view of a combiner heads-up display assembly having a motion transfer mechanism, with the combiner heads-up display assembly transitioning between a stowed position and a deployed position, according to embodiments of the present invention.

In operation, the combiner HUD assembly 32 is as shown in FIG. 3, where the linkage members 14a,14b,14c,14d are in the first configuration, and the display device 22 is in the stowed position. The pin 26 is in contact with the first linkage member 14a at the first contact point 28. When the motor 24 is actuated, the third linkage member 14c is driven for rotation by the motor 24 in the first direction 34. This causes the first linkage member 14a and the bracket 16 to pivot about an axis 40 which extends through the first pivot point 18a, and the pin 26 moves away from the first linkage member 14a such that the pin 26 moves along in the direction of an arc 42, where the arc 42 partially extends around the first pivot point 18a. As the first linkage member 14a continues to pivot about the axis 40, the bracket 16 also pivots about the axis 40, and the bracket 16, the first pivot point 18a, and axis 40 move relative to the housing 12.

As the first linkage member 14a and the bracket 16 pivot about the axis 40 and the pin 26 moves away from the first contact point 28 and along the arc 42, the linkage members 14a,14b,14c,14d change position relative to one another as well. The second linkage member 14b pivots about the third pivot point 18c, and the fourth linkage member 14d pivots about the seventh pivot point 18g. Furthermore, the third linkage member 14c pivots relative to the bracket 16 at the fourth pivot point 18d, the first linkage member 14a pivots relative to the second linkage member 14b at the second pivot point 18b, and the first linkage member 14a also pivots relative to the fourth linkage member 14d at the sixth pivot point 18f.

The motor 24 continues to move first linkage member 14c in the first direction 34, such that the first linkage member 14a and bracket 16 pivot about the axis 40 until the pin 26 contacts the first linkage member 14a at the second contact point 30, as shown in FIG. 5. When the pin 26 is in contact with the first linkage member 14a at the second contact point 30, the linkage members 14a,14b,14c,14d are in the second configuration, the combiner mirror 22 is in the deployed position, and the motor 24 is deactivated.

When it is desired to change the combiner mirror 22 back to the stowed position, the motor 24 is reactivated to cause the third linkage member 14c to rotate in the second direction 36. This causes the pin 26 to move away from the first linkage member 14a such that the pin 26 is no longer in contact with the first linkage member 14a at the second contact point 30. The bracket 16 and first linkage member 14a pivot about the axis 40 as the as the pin 26 again moves along the arc 42. Again, the second linkage member 14b pivots about the third pivot point 18c, the fourth linkage member 14d pivots about the seventh pivot point 18g, the third linkage member 14c pivots relative to the bracket 16 at the fourth pivot point 18d, the first linkage member 14a pivots relative to the second linkage member 14b at the second pivot point 18b, and the first linkage member 14a pivots relative to the fourth linkage member 14d at the sixth pivot point 18f.

The third linkage member 14c is rotated in the second direction 36, and the bracket 16 and first linkage member 14a pivot about the axis 40 until the pin 26 is again in contact with the first linkage member 14a at the first contact point 28, the linkage members 14a,14b,14c,14d are back in the first configuration, and the combiner HUD assembly 32 is again in the stowed position, as shown in FIG. 3.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motion transfer mechanism, comprising:
    at least one linkage member having a first configuration and a second configuration;
    an actuator for controlling the movement of the at least one linkage member between the first configuration and the second configuration;
    a bracket pivotally connected to the at least one linkage member;

and
a mechanical stop integrally formed with the bracket;
a housing, the at least one linkage member, the bracket and the actuator being located in the housing;
a display device connected to the bracket;
wherein the display device is in a stowed position when the at least one linkage member is in the first configuration, and the display device is in a deployed configuration when the at least one linkage member is in the second configuration;
wherein the mechanical stop is in contact with the at least one linkage member when the linkage member is in the first configuration and the second configuration.

2. The apparatus of claim 1, the at least one linkage member further comprising:
a first contact point located where the mechanical stop contacts the at least one linkage member when the at least one linkage member is in the first configuration;
a second contact point located where the mechanical stop contacts the at least one linkage member when the at least one linkage member is in the second configuration;
wherein the mechanical stop moves along an arc as the mechanical stop moves between the first contact point and the second contact point.

3. The apparatus of claim 2, further comprising at least one pivot point, the at least one linkage member being connected to the bracket at the at least one pivot point, wherein the first contact point is located on the at least one linkage member on the opposite side of the at least one pivot point in relation to the second contact point.

4. The apparatus of claim 1, the at least one linkage member further comprising:
a first linkage member, connected to the bracket, the mechanical stop integrally formed with the first linkage member;
a second linkage member connected to the first linkage member and a housing;
a third linkage member connected to the bracket, the third linkage member rotated by the actuator; and
a fourth linkage member connected to the first linkage member and the housing;
wherein the third linkage member is rotated in a first direction to change the first linkage member, the second linkage member, the third linkage member, and the fourth linkage member from the first configuration to the second configuration, and the third linkage member is rotated in a second direction to change the first linkage member, the second linkage member, the third linkage member, and the fourth linkage member from the second configuration to the first configuration.

5. The apparatus of claim 4, wherein the mechanical stop is in contact with the first linkage member when the first linkage member, the second linkage member, the third linkage member, and the fourth linkage member are in the first configuration or the second configuration.

6. The apparatus of claim 1, wherein the mechanical stop is a pin.

7. The apparatus of claim 1, the display device further comprising a combiner mirror.

8. A combiner heads-up display assembly having a motion transfer mechanism, comprising:
a housing;
a plurality of linkage members disposed in the housing;
an actuator connected to one of the plurality of linkage members, the actuator disposed in the housing;
a bracket connected to one of the plurality of linkage members;
a display device connected to the bracket, the actuator changing the plurality of linkage members between a first configuration, where the display device is in a stowed position, and a second configuration, where the display device is in a deployed position; and a pin integrally formed with the bracket;
wherein the pin is in contact with at least one of the plurality of linkage members when the display device is in the stowed position and the deployed position.

9. The combiner heads-up display assembly of claim 8, the plurality of linkage members further comprising:
a first linkage member connected to the bracket;
wherein the pin is in contact with the first linkage member when the display device is in the stowed position and the deployed position.

10. The combiner heads-up display assembly of claim 9, further comprising:
a first contact point located on the first linkage member;
a second contact point located on the first linkage member; and
wherein the pin is in contact with the first contact point when the display device is in the stowed position, and the pin is in contact with the second contact point when the display device is in the deployed position.

11. The combiner heads-up display assembly of claim 10, further comprising at least one pivot point, the first linkage member being connected to the bracket at the at least one pivot point, wherein the first contact point is located on the first linkage member on the opposite side of the at least one pivot point in relation to the second contact point.

12. The combiner heads-up display assembly of claim 9, the plurality of linkages further comprising:
a second linkage member connected to the first linkage member and the housing;
a third linkage member connected to the bracket, the third linkage member rotated by the actuator;
a fourth linkage member connected to the first linkage member and the housing;
wherein the third linkage member is rotated in a first direction to change the first linkage member, the second linkage member, the third linkage member, and the fourth linkage member from the first configuration to the second configuration, and change the display device from the stowed position to the deployed position, and the third linkage member is rotated in a second direction to change the first linkage member, the second linkage member, the third linkage member, and the fourth linkage member from the second configuration to the first configuration, and the display device from the deployed position to the stowed position.

* * * * *